(12) United States Patent
Christiansen

(10) Patent No.: US 6,440,251 B1
(45) Date of Patent: Aug. 27, 2002

(54) FIRE RESISTANT SANDWICH BOARD

(75) Inventor: Carsten Christiansen, Hundested (DK)

(73) Assignee: Inexa Panel A/S, Hundested (DK)

( * ) Notice: Subject to any disclaimer, the term of this patent is extended or adjusted under 35 U.S.C. 154(b) by 0 days.

(21) Appl. No.: 09/324,285

(22) Filed: Jun. 2, 1999

Related U.S. Application Data

(63) Continuation-in-part of application No. PCT/DK96/00507, filed on Dec. 3, 1996, now abandoned.

(51) Int. Cl.⁷ .............................. B32B 31/00; B44C 1/16
(52) U.S. Cl. ...................... 156/233; 156/235; 156/238; 156/240; 156/264; 156/270; 156/277; 427/147; 427/148; 428/327
(58) Field of Search .............................. 156/233, 235, 156/238, 240, 239, 264, 270, 277, 512; 427/147, 148; 428/327

(56) References Cited

U.S. PATENT DOCUMENTS 4,411,667 A * 10/1983 Meredith et al. .............. 8/471
5,114,755 A * 5/1992 Canaday et al. ............ 427/373

FOREIGN PATENT DOCUMENTS

| EP | 0 060 107 | 9/1982 |
| EP | 0 072 461 | 2/1983 |
| GB | 2 151 983 | 7/1985 |
| JP | 940262477 | 10/1994 |
| JP | 08001086 | * 1/1996 |
| SE | 385 673 | 7/1976 |

* cited by examiner

Primary Examiner—Linda Gray
(74) Attorney, Agent, or Firm—Thomas R. Vigil; Welsh & Katz, Ltd.

(57) ABSTRACT

A coil of liner for a fire resistant sandwich board is manufactured by providing a continuous web of steel plate (11) coated on one side with a layer of polyester with embedded polyamide spheres, providing a continuous web of transfer material (12) printed with indicia in a sublimable dye, bringing said webs in surface-to-surface contact and running them around part of the circumference of a heated roller (13) to effect printing of the web of steel plate by a sublimation process. The liner has a pleasant appearance and the board manufactured according to the invention shows excellent performance in fire tests.

11 Claims, 2 Drawing Sheets

FIRE RESISTANT SANDWICH BOARD

CROSS REFERENCE TO RELATED APPLICATIONS

This is a continuation-in-part of International Application PCT/DK96/00507 with international filing date of Dec. 3, 1996, now abandoned.

BACKGROUND OF THE INVENTION

1. Field of the Invention

The present invention relates to fire resistant sandwich boards intended for use as wall panels or ceilings in interiors of rooms subject to stringent fire codes, e.g. interiors on board ships, oil platforms or inside certain types of building structures. The invention further relates to methods of manufacturing such sandwich boards or intermediate products for this use.

2. The Prior Art

Various requirements applying to wall panels and ceilings for such applications e.g. related to cost, weight, heat insulation, sound insulation, resistance to wear, resistance to chemicals, aesthetic value in addition to fire hazard considerations have led to the introduction of sandwich boards in various forms. A sandwich board of relevance in the present context comprises a core of mineral wool with steel plate liners on both sides. For structural considerations the mineral wool core is preferably arranged with the fibres extending crosswise, i.e. so as to span the liner interspace and the liners adhered to the core by adhesive. Some examples of this kind of sandwich board are explained in Swedish patent publication No. SE 385 673. For reasons of aesthetic value it is commonly used to laminate the steel liners with plastic or to cover them with PVC foil. A PVC foil of a thickness 0.150 mm can be coloured and textured to provide an attractive appearance. Although a product of this kind satisfies most of the codes presently applied, the plastic laminate inevitably is a source of heat release and a source of harmful and poisonous gases when exposed to open fire. It has been suggested to cover the steel liners with a very thin layer of polymer material, e.g. a layer with a surface thickness of 0.030 mm in order to minimise heat release and gas release under fire exposure. However, such products have failed to gain acceptance on the market because of the lack of aesthetic value offered. The publication WO 95/30 552 contains the suggestion of building a sandwich wall panel with a metal liner with a decorative colouring, e.g. a reproduction of a photograph or of a piece of art. According to this publication the board panel is manufactured by stacking together various components among which metal foil and a transfer paper and by heat pressing the stack for a time period of 5 to 30 minutes whereby the dye transfers to the plate surface. EP-A 00 72 461 contains a suggestion for continuous printing of a steel plate of a thickness of 0.75 mm by a transfer process which takes place between a double band press. DE-C 26 42 350 and DE-C 29 14 704 offer various suggestions for dyes and printing methods related to transfer printing of textiles.

The solutions suggested in the prior art do not seem to have gained any share of the market in fireproof panels, presumably because the manufacturing methods are too cumbersome or costly or perhaps because they failed to come up with products which can truly meet all the applicable requirements.

SUMMARY OF THE INVENTION

The invention, in a first aspect, provides a method of manufacturing a coil of liner for use in the manufacturing of a sandwich board, said method comprising the steps of:

providing a continuous web of steel plate coated on one side with a layer of polyester with embedded polyamide spheres, providing a continuous web of transfer material, which transfer material exhibits at least one face printed with indicia in a sublimable dye, bringing said webs together with said printed face in surface contact with a face of said steel plate web, running said contacting webs around part of the circumference of a heated roller while running a blanket around at least part of said roller in overlying relationship with said webs, said blanket being tensioned around said part of said roller in order to substantially prevent any slippage between said webs, the extent of circumference covered by said webs, the speed of revolution of said roller, and the temperature of said roller being selected to allow a sublimation process to take place between said webs, which process yields a web of printed steel plate and a web of spent transfer material, separating said web of spent transfer material from said web of printed steel plate, air cooling said web of printed steel plate until the print has cured, bringing a web of polymer foil together with said web of printed steel plate in bonded contact whereby to provide a liner, and cutting a length of said liner and winding it on a liner take-up roll, whereby to provide said coil.

This provides a highly efficient manufacturing method adapted for outputting a liner by means of which it is possible to manufacture a sandwich board, which board satisfies all the requirements mentioned above and which exhibits a performance during fire tests superior to those achieved by the majority of boards on the market today. The liner is imprinted by way of a transfer process which permits a large variety of colours and patterns. The surface finish is highly resistant to wear and the product may be shipped with a protective covering which may stay in place preserving the surface finish until one of the last stages of room finishing.

The invention, in a second aspect, provides a method of manufacturing a fire resistant sandwich board comprising the steps of:

providing a continuous web of steel plate coated on one side with a layer of polyester with embedded polyamide spheres, providing a continuous web of transfer material, which transfer material exhibits at least one face printed with indicia in a sublimable dye, bringing said webs together with said printed face in surface contact with a face of said steel plate web, running said contacting webs around part of the circumference of a heated roller while running a blanket around at least part of said roller in overlying relationship with said webs, said blanket being tensioned around said part of said roller in order to substantially prevent any slippage between said webs, the extent of circumference covered by said webs, the speed of revolution of said roller, and the temperature of said roller being selected to allow a sublimation process to take place between said webs, which process yields a web of printed steel plate and a web of spent transfer material, separating said web of spent transfer material from said web of printed steel plate, air cooling said web of printed steel plate until the print has cured, bringing a web of polymer foil together with said web of printed steel plate in bonded contact whereby to provide a liner, cutting a length of said liner and winding it on a liner take-up roll, whereby to provide a coil, forming a web of liner by unwinding said coil, cutting from said liner web a pair of substantially identical sections, placing said sections and said board in overlying sandwich arrangement and adhering said sections with said board, and subjecting the sandwich to pressure and heat in order to cure the adhesive.

This provides the manufacturing of a sandwich board capable of meeting the strictest fire requirements and capable of meeting also the multitude of other requirements referred to above. The board can be manufactured at comparatively low cost.

The invention, in a third aspect, provides a fire resistant sandwich board comprising a mineral wool board core and a pair of steel plate liners adhered onto respective sides of said core, at least one of said steel plate liners being surface treated on a side facing away from the core with a coating, which coating comprises polyester with embedded polyamide spheres and a top finish with a decorative pattern, which top finish has been applied by way of sublimation process.

This board meets all requirements relevant to a board for use as interior wall panel or ceiling as explained above.

Preferred embodiments appear from the dependent claims.

Further features and advantages of the invention will appear from the description of preferred embodiments given below with reference to the appended drawings.

DESCRIPTION OF THE PREFERRED EMBODIMENTS

All the drawings are schematic and not necessarily to scale and illustrate only parts essential to facilitate understanding the invention, other parts being omitted from the drawings for the sake of clarity. Throughout the drawings identical references are used to designate identical of similar items.

Figure 1:
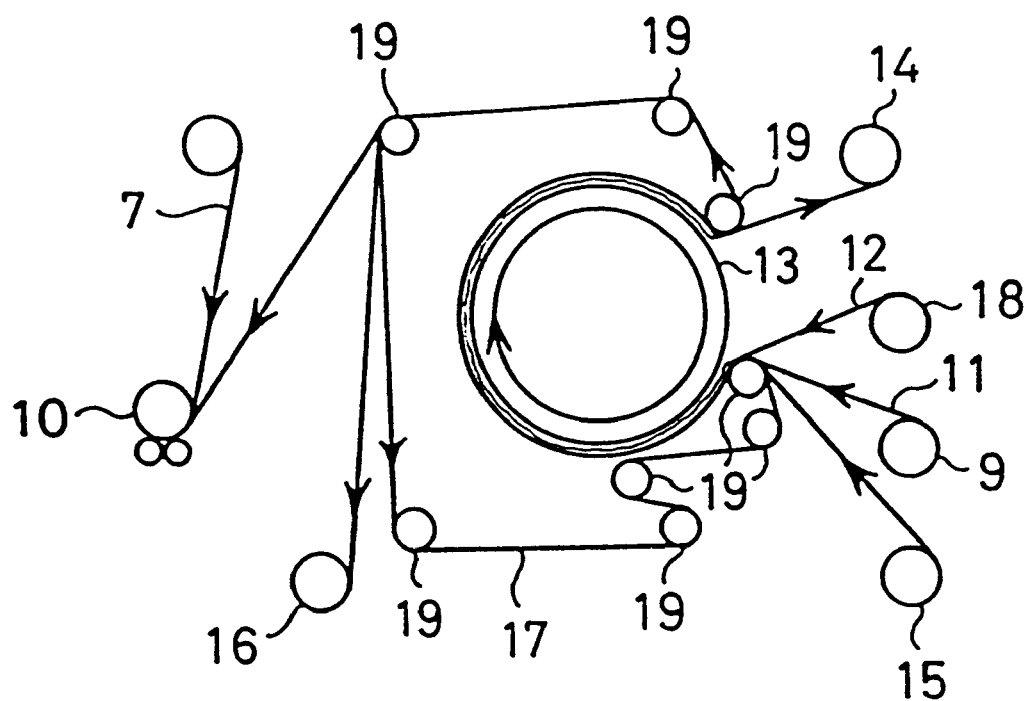
FIG. 1 illustrates schematically a transfer printing station used according to the method according to the invention.

Reference is first made to FIG. 1 for a brief explanation of the transfer printing process as applied according to the invention. In the station illustrated in FIG. 1 steel plate web 11 unrolled from the coil 9 is brought together with transfer material web 12 unrolled from the transfer take-off roller 18 in surface-to-surface contact while passing around a guide roller 19 to enter into contact with the surface of heated roller 13.

Backing paper unrolled from backing paper take-off roller 15 is placed on the outside of the steel plate web 11 and the layers are brought into surface contact with the cylindrical surface of heated roller 13 and held together by means of the pressure applied by blanket 17 which follows an endless loop and which is tensioned to the extent of applying a radial surface pressure onto the webs sufficient to prevent any slippage between the transfer material and the steel plate.

In a preferred embodiment of the invention a pressure within the range from 2 to 4 Bars has been found effective.

The diameter of the heated roller may be 500 mm and the roller is preferably kept to a temperature of 210° C. The transfer material web and the steel plate web pass around approximately 80% of the roller periphery to leave the heated roller by making a turn around another guide roller 19.

At the guide roller where the webs leave the heated roller, the transfer material web is separated from the steel plate web to be wound on transfer take-up roller 14.

The speed of revolution of the heated roller is tuned to achieve a contact time for every point on the web in the order of 20 to 30 seconds which has been found sufficient to ensure a satisfactory transfer printing by sublimation. In the preferred embodiment the equivalent speed of web motion will be in the range 3 to 5 meters per minute.

For other embodiments featuring larger diameter rollers, e.g. up to 2,000 mm, the speed of revolution is set to correspondingly lower values in order to maintain a contact time in the order of 20 to 30 seconds.

The density of dye applied in the sublimation process is estimated to be in the range of 1 to 5 $g/m^2$ preferably 1 to 2 $g/m^2$.

Having been separated from the spent transfer material, the hot steel plate web 11 passes two more guide rollers and is separated from the backing paper and from the blanket. Following a straight pass, the steel plate web is wound onto coil 10 together with an interlayered web of foil 7.

In the preferred embodiment, foil 7 comprises a polyethylene foil of a thickness of approximately 20 microns. The polyethylene foil is surface treated on the side facing the print on the steel plate web with adhesive. This kind of foil has been found to provide adequate protection of the liner and it can easily be peeled off when desired without tearing. Other embodiments aimed for sturdy protection may feature heavier grade foils.

The steel plate web 11 leaves the heated roller with a temperature about 210° C. and cools down in the air to a temperature in the range approximately 60 to 70° C. at the point of winding on the liner coil 10. The remanent heat of the steel plate web furthers the adhesion of the protective foil.

The coil of steel plate 9 used in this process comprises a steel plate of a thickness in the range of 0.5 to 0.7 mm, the steel plate having been pre-treated with a surface coating. This surface coating, which is applied in a set-up not illustrated in the drawings, comprises a polyester based material with embedded spheres of polyamide. In the preferred embodiment a base layer of polyester material is applied to the steel plate and cured, and a top layer of polyester with suspended polyamide spheres is subsequently applied and cured.

The base layer comprises approximately 15 grams per square meter of polyester based material, while the top layer comprises an additional approximately 15 grams per square meter of polyester based material with 3 to 4 grams per square meter polyamide spheres. By this method the polyamide spheres are arranged predominantly in the top surface where they serve to produce an attractive appearance and to ensure wear resistance while the polyester material can fulfil the purposes of securing the spheres, protecting the steel surface and nesting the dye applied in the transfer printing.

Figure 2:
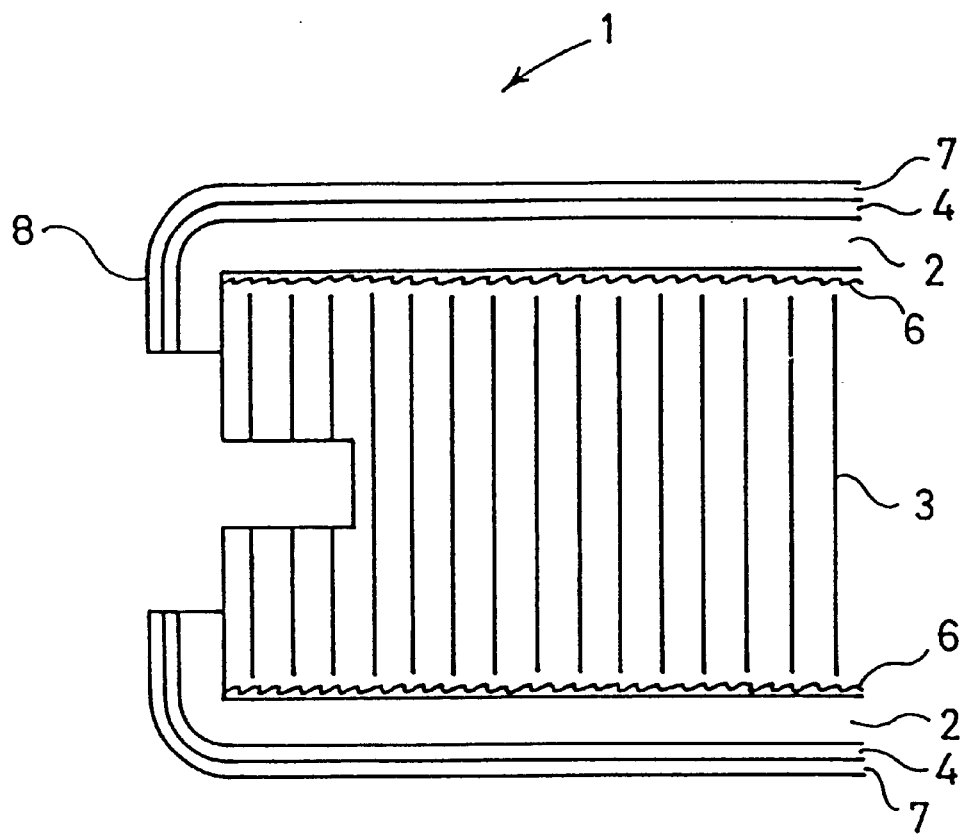
FIG. 2 shows a transverse section through a portion the board according to the invention.

Reference is now made to FIG. 2 illustrating a cross sectional view through a portion of the board manufactured according to the invention. The sandwich board I comprises core 3 sandwiched between liners 2. In the preferred embodiment the core comprises mineral wool wherein the fibres are oriented to extend mainly in directions transverse to the liners. The liners comprise steel plates manufactured in the process explained above and adhered to the core by a glue 6 on polyurethane basis.

Each liner comprises on the side facing away from the core the coating 4, the print indicia 5 and the protective foil 7.

FIG. 2 also illustrates the board edge 8 wherein a border region of each liner is angled to strengthen and protect the board edges and the core is notched so as to permit insertion of fixture means.

Figure 3:
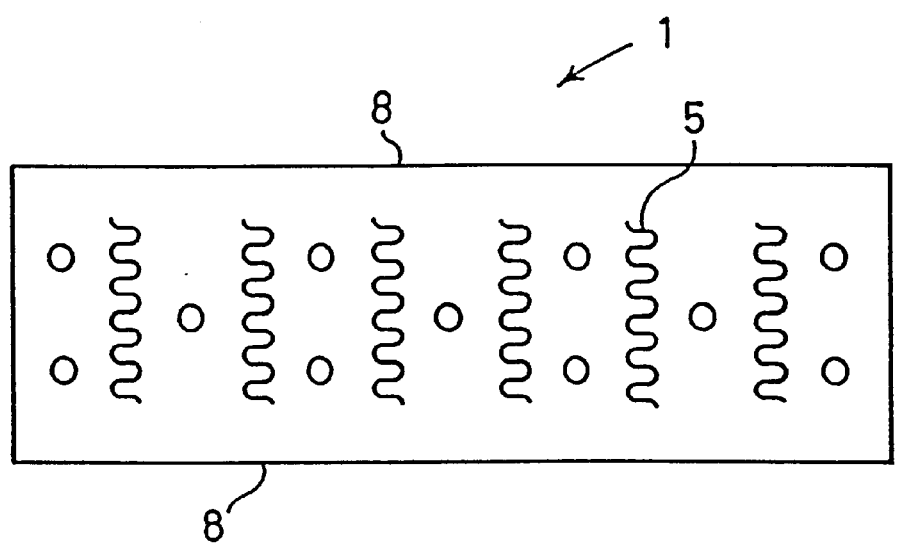
FIG. 3 shows a planar view of a board according to the invention.

FIG. 3 illustrates a sandwich board 1 according to the invention in a planar view to illustrate just one example of print indicia 5.

The sandwich board 1 according to the invention is manufactured in a process line where the liner coil in unwound, treated with polyurethane adhesive and cut into sections of a suitable format. As the sandwich board is preferably manufactured with similar or identical opposite sides, it is preferred to cut a pair of identical liner blanks.

A board of mineral wool oriented so that the fibres extend generally crosswise and cut into a suitable format is placed on top of one liner blank of the pair while the other blank is inverted and placed on top of the mineral wool board. The assembly is heat pressed to cure the polyurethane adhesive and in subsequent stages the edges are finished.

Boards according to the invention have been successfully manufactured in widths ranging from 100 mm, to 1,250 mm and lengths from 800 mm to 10,000 mm. The thickness of the sandwich boards, which have by now been manufactured according to the invention, ranges from 25 mm to 100 mm, the bulk comprising thicknesses of 25 mm. or 50 mm. Other dimensions can be manufactured by similar methods.

In fire tests according to the Nordtest method NT Fire 025 and ISO/DIS 9705, sandwich boards according to the invention and comparable boards covered with 0.150 mm of PVC foil have been exposed to gas flames. Among the results of the these tests were noted a heat release from the boards according to the invention of 0.6 to 0.9 MJ/m$^2$ as compared to 5 MJ/m$^2$ for the PVC foil covered boards. The release of HCl from the inventive boards was about 0.6% of the values noted for the PVC boards. Values for release of other gasses and smoke were all substantially lower for the inventive boards.

Although specific embodiments of the invention have been explained in more detail above this is not intended to exclude that the invention could be practised in other ways within the scope of the appended patent claims.

I claim:

1. A method of manufacturing a coil of liner for use in the manufacturing of a sandwich board, said method comprising the steps of:

providing a web of steel plate coated on one side with a layer of polyester with embedded polyamide spheres, providing a web of transfer material, which transfer material exhibits at least one face printed with indicia in a sublimable dye, bringing said webs together with said printed face in surface contact with a face of said steel plate web, running said contacting webs around part of the circumference of a heated roller while running a blanket around at least part of said roller in overlying relationship with said webs, said blanket being tensioned around said part of said roller in order to substantially prevent any slippage between said webs, the extent of circumference covered by said webs, the speed of revolution of said roller, and the temperature of said roller being selected to allow a sublimation process to take place between said webs, which process yields a web of printed steel plate and a web of spent transfer material, separating said web of spent transfer material from said web of printed steel plate, air cooling said web of printed steel plate until the print has cured, bringing a web of polymer foil together with said web of printed steel plate in bonded contact whereby to provide a liner, and winding said web of polymer foil together with said web of printed steel plate in bonded contact on a liner take-up roll, whereby to provide said coil.

2. The method according to claim 1, wherein the step of bringing said polymer foil web into contact with said steel plate web is carried out at a stage where said steel plate web is heated sufficiently to make said polymer foil tacky.

3. The method according to claim 1, wherein said steel plate web has a gauge of at least 0.3 mm.

4. The method according to claim 1, wherein the speed of said roller is selected to achieve a dwell time of contact between said roller and said webs in the range of 20 to 30 seconds.

5. The method according to claim 1, wherein the roller-temperature is kept in the range of 150 to 240° C.

6. The method according to claim 1, wherein the thickness of the polyester coating is selected to be below 50 microns while the density of the dye applied by the printing is selected to be below 5 grams per square meter.

7. The method according to claim 1, wherein said polymer foil comprises a polyethylene based material and has a tear strength which is sufficiently high to allow peeling off said foil substantially without tearing.

8. The method according to claim 1, wherein said steel plate web has a gauge of at least 0.5 mm.

9. The method according to claim 1, wherein the roller temperature is kept i the range of 200 to 220° C.

10. The method according to claim 1, wherein the thickness of the polyester coating is selected to be below 40 microns while the density of the dye applied by the printing is selected to be below 5 grams per square meter.

11. A method of manufacturing a sandwich board comprising a core element having two opposite sides coated with a liner, said method comprising the steps of:

providing a web of steel plate coated on one side with a layer of polyester with embedded polyamide spheres, providing a web of transfer material, which transfer material exhibits at least one face printed with indicia in a sublimable dye, bringing said webs together with said printed face in surface contact with a face of said steel plate web, running said contacting webs around part of the circumference of a heated roller while running a blanket around at least part of said roller in overlying relationship with said webs, said blanket being tensioned around said part of roller in order to substantially prevent any slippage between said webs, the extent of circumference covered by said webs, the speed of revolution of said roller, and the temperature of said roller being selected to allow a sublimation process to take place between said webs, which process yields a web of printed steel plate and a web of spent transfer material, separating said web of spent transfer material from said web of printed steel plate, air cooling said web of printed steel plate until the print has cured, bringing a web of polymer foil together with said web of printed steel plate in bonded contact whereby to provide a liner, winding said web of polymer foil together with said web of printed steel plate in bonded contact on a liner take-up roll, whereby to provide said coil, forming a web of liner by unwinding said coil, placing an adhesive material on said liner, cutting from said web of polymer foil together with said web of printed steel plate in bonded contact a pair of substantially identical sections, placing said sections in overlying sandwich arrangement and adhering said sections to said core element, and subjecting the sandwich to pressure and heat in order to cure the adhesive material to form the sandwich board.

\* \* \* \* \*